INVENTOR.
ALEXANDER M. ALEXANDRESCU
BY
ATTORNEYS.

Sept. 20, 1960 A. M. ALEXANDRESCU 2,952,976
ROTARY TURBINE TYPE FLUID COUPLING
Filed Oct. 16, 1956 8 Sheets-Sheet 2

INVENTOR.
ALEXANDER M. ALEXANDRESCU
BY
ATTORNEYS.

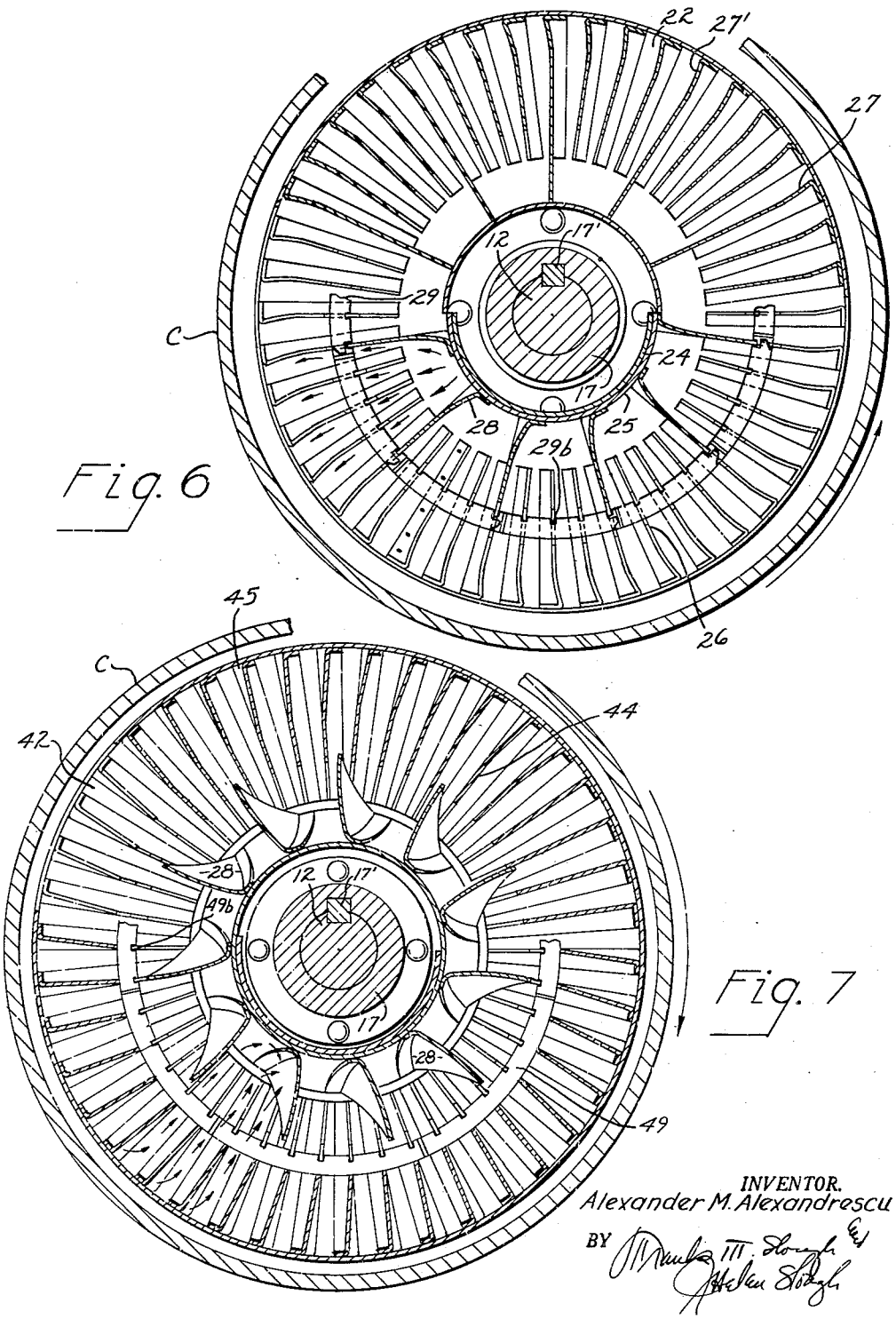

Sept. 20, 1960 A. M. ALEXANDRESCU 2,952,976
ROTARY TURBINE TYPE FLUID COUPLING
Filed Oct. 16, 1956 8 Sheets-Sheet 4

INVENTOR.
ALEXANDER M. ALEXANDRESCU
BY
ATTORNEYS.

Sept. 20, 1960  A. M. ALEXANDRESCU  2,952,976
ROTARY TURBINE TYPE FLUID COUPLING
Filed Oct. 16, 1956  8 Sheets-Sheet 5

INVENTOR.
Alexander M. Alexandrescu

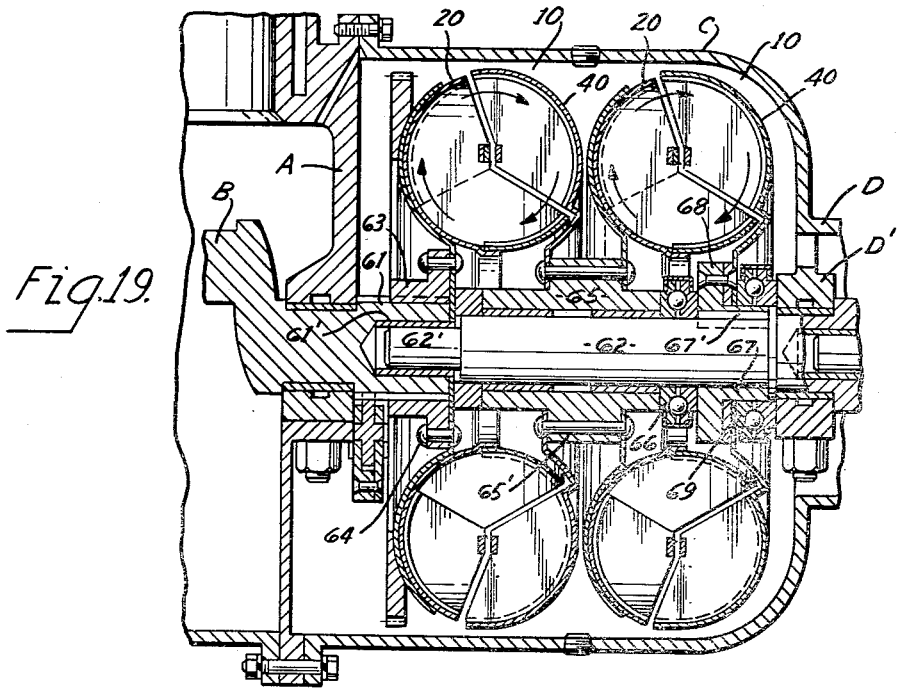
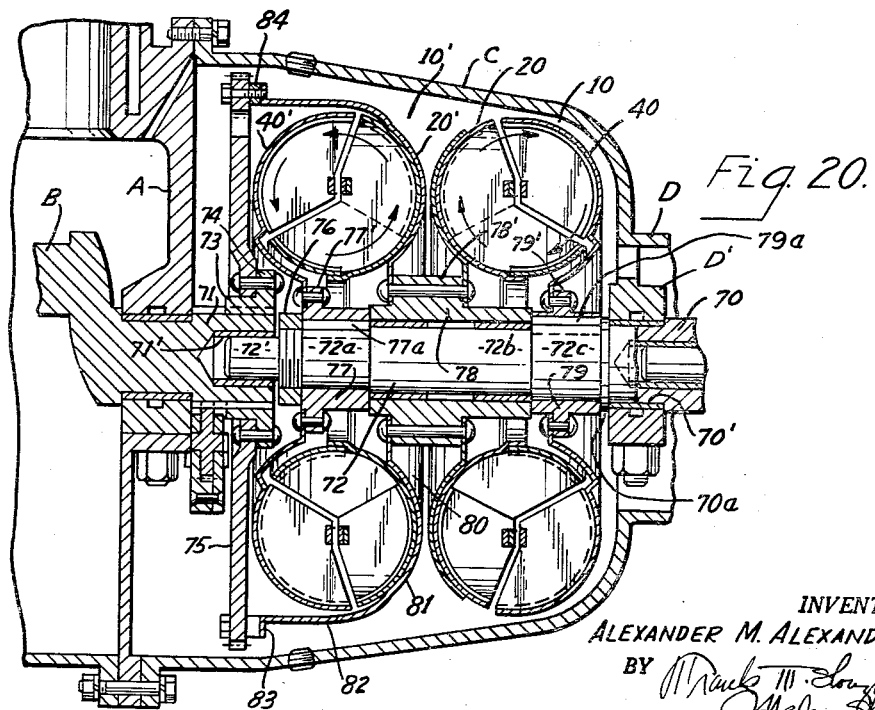

Sept. 20, 1960  A. M. ALEXANDRESCU  2,952,976
ROTARY TURBINE TYPE FLUID COUPLING
Filed Oct. 16, 1956                     8 Sheets-Sheet 7
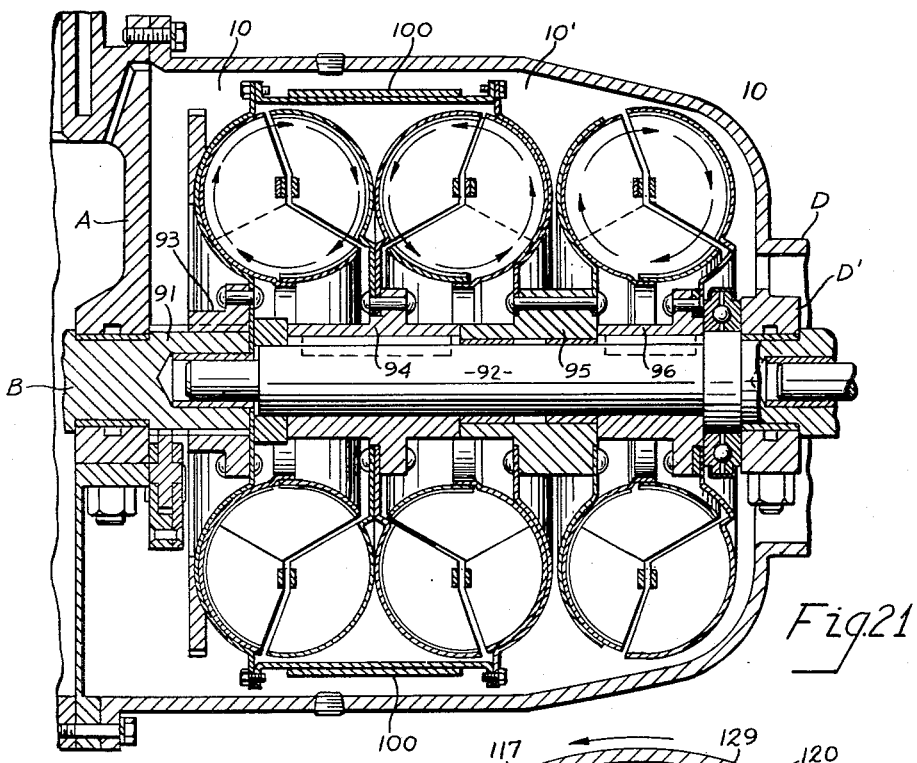
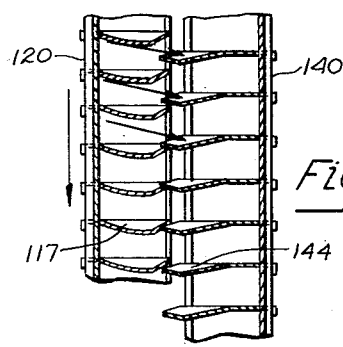
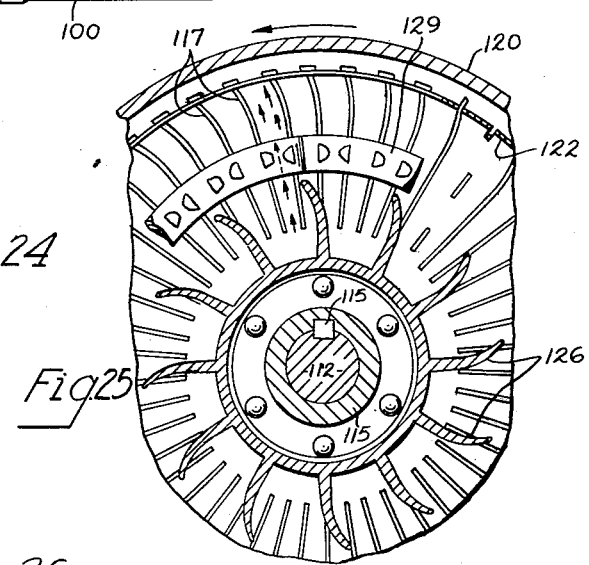
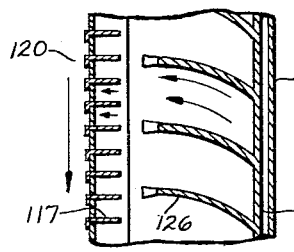
INVENTOR.
Alexander M. Alexandrescu

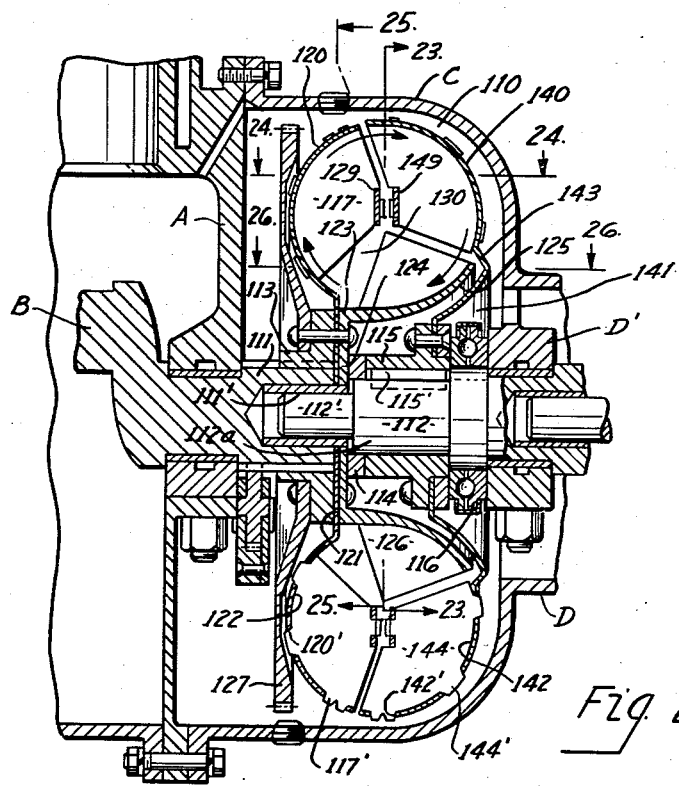
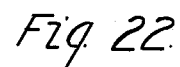
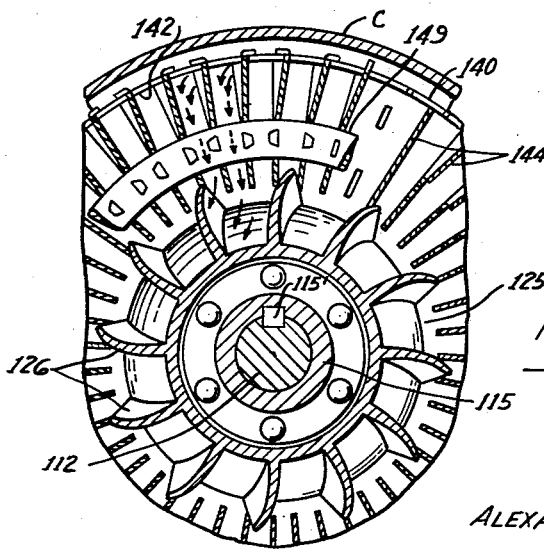

United States Patent Office 2,952,976
Patented Sept. 20, 1960

2,952,976
ROTARY TURBINE TYPE FLUID COUPLING
Alexander M. Alexandrescu, 549 E. 114th St., Cleveland 8, Ohio
Filed Oct. 16, 1956, Ser. No. 616,291
3 Claims. (Cl. 60—54)

My invention relates to improvements in fluid couplings and more particularly to fluid couplings for use in automotive vehicles and the like, such as I have disclosed in my United States Patent No. 2,569,087, "Rotary Turbine Type Fluid Coupling," issued September 25, 1951, and my United States Patent No. 2,720,952, "Rotary Turbine Type Fluid Coupling," issued October 18, 1956.

It is an object of my present invention to provide a fluid coupling device of the above mentioned type incorporating substantial improvements in design and function over previous types of fluid couplings.

Another object of my invention is to provide a fluid coupling device which is so designed as to prevent excessive slippage in the transmission of power.

A further object of my invention is the provision of an improved fluid coupling device which produces a substantial torque multiplication and is, in fact, a transmission in itself.

Yet another object of my invention is to provide an improved fluid coupling device readily adaptable to all makes or types of automatic transmissions without necessitating major changes in the rear of the vehicle engine, the transmission casing, or the internal parts of the mechanical transmission.

Still another object of my invention is to provide an improved fluid coupling device designed for economical production on high speed machinery.

Further objects of my invention and the invention itself will become more readily apparent from a study of the appended description and the attached drawings, in which drawings:

Fig. 6 is a generally vertically cut transverse sectional view taken along the line 6—6 of Fig. 1;

Fig. 7 is a generally vertically cut transverse sectional view taken along the line 7—7 of Fig. 1;

Fig. 19 is a view similar to Fig. 1 showing two fluid coupling units of my invention mounted in series;

Fig. 20 is a view similar to Fig. 19 showing two of my fluid coupling units mounted in parallel;

Fig. 21 is a view similar to Figs. 19 and 20 showing three of my fluid coupling units mounted in parallel;

Fig. 22 is a view similar to Fig. 1 showing a modification of the fluid coupling unit of my invention;

Fig. 23 is a vertically cut, transverse sectional view taken along the line 23—23 of Fig. 22;

Fig. 24 is a fragmentary sectional view taken along the line 24—24 of Fig. 22;

Fig. 25 is a generally vertically cut, transverse sectional view taken along the line 25—25 of Fig. 22; and Fig. 26 is a fragmentary sectional view taken along the line 26—26 of Fig. 22;

Figure 1:
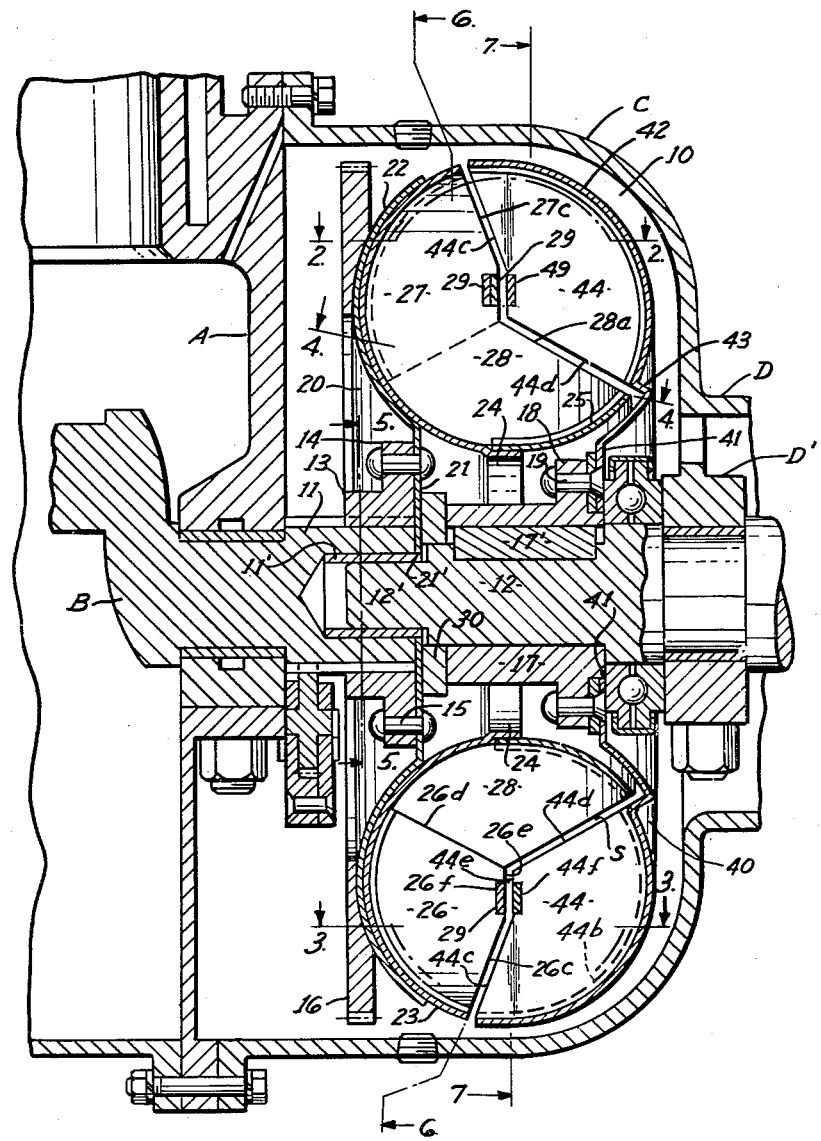
Fig. 1 is a vertically cut, longitudinal sectional view of the fluid coupling unit of my invention.

Referring now to the drawings in which like parts are designated by like reference characters, and more particularly to Fig. 1, at A I show the rearmost portion of an engine block having a crankshaft B of an automotive engine journaled therein, and a fluid coupling housing C bolted thereto as by bolts 1. The fluid coupling housing C is provided with a transmission casing D extending rearwardly therefrom.

As herein illustrated, the automotive engine and the transmission are not shown, as they are well known in the art and may be of the conventional type. It will be understood that the engine would be disposed on the left side of the fluid coupling, as shown in Fig. 1, and the transmission would be on the right side as shown in that figure, the directions of said engine and transmission hereinafter for convenience being referred to as "forward" and "rearward," respectively. The above described directions, corresponding to those ordinarily found in American automobiles in use at the present time, are maintained throughout the several showings of novel forms, embodiments, and mechanical arrangements of the fluid coupling of my invention, it being understood, however, that this arrangement is not essential to my invention.

The fluid coupling unit 10, axially mounted for rotation within the fluid coupling housing C, comprises a driving portion or impeller 20 and a driven portion or turbine 40, said impeller and turbine being preferably formed of sheet steel or the like material.

The impeller 20 comprises a main disc 21, having an outer circumferentially continuous, arcuately dished portion 22, said dished portion being rearwardly concave nestingly interfitted with the forwardly convex surface of a more extensively outer circumferentially continuous, arcuately dished driver blade housing 23. The driver blade housing 23 terminates at the inner periphery thereof in a circumferentially reduced, axially relatively short cylindrical portion 24, said cylindrical portion being adapted to telescopically interfit within the inner and forwardly disposed periphery of a rearwardly and radially outwardly flared shifter vane housing 25. The main disc 21, the driver blade housing 23, and the shifter vane housing 25 are preferably integrally joined, preferably by welding or other suitable means.

The impeller 20 is provided with a plurality of radially outwardly disposed driver blades 26 and fluid shifter blades 27, there being, in the form shown in Fig. 1, thirty-three of said driver blades and eleven of said fluid shifter blades. The driver blades 26 and the fluid shifter blades 27 are preferably circumferentially evenly spaced, with three of said driver blades being preferably interposed between circumferentially adjacent fluid shifter blades, as best shown in Fig. 6.

Figures 14, 15:
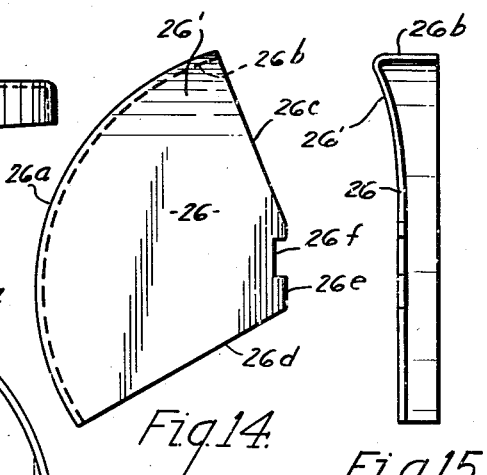
Fig. 14 is a side plan view of a fluid driver blade of the impeller of my fluid coupling.
Fig. 15 is an end view of the fluid driver blade shown in Fig. 14.
Figure 16:
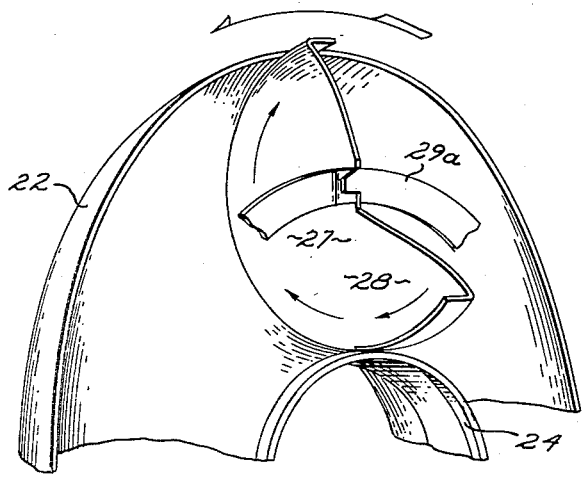
Fig. 16 is a fragmentary perspective view of the impeller of my fluid coupling showing one fluid shifter blade mounted therein, all other impeller blades having been omitted for clarity.
Figure 17:
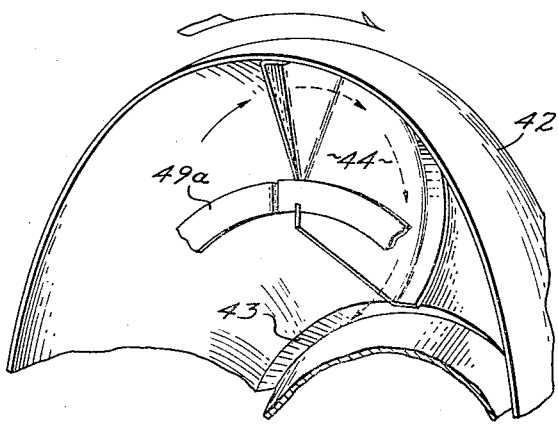
Fig. 17 is a fragmentary perspective view of the turbine of my fluid coupling showing one turbine blade mounted therein, all other turbine blades having been omitted for clarity.
Figure 18:
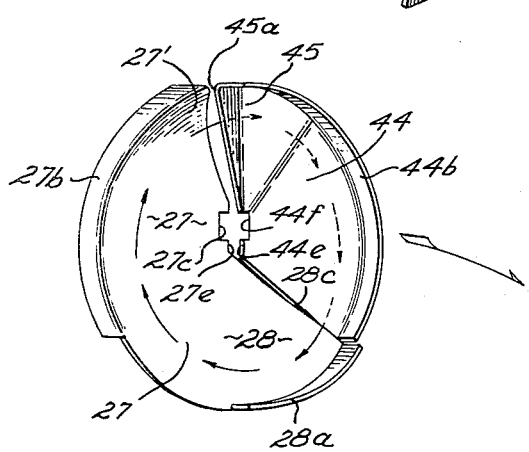
Fig. 18 is an isolated perspective view of a fluid shifter blade and a turbine blade showing the relationship of said blades in operation, all other parts having been omitted for clarity.

In Figs. 14 and 15, there are shown detailed views of a driver blade 26, said blade being formed preferably of sheet steel and having a concavely rounded edge 26a, said edge being provided with a right angularly disposed flange 26b and two converging straight edge portions 26c and 26d, said convergent straight edge portions intersecting a vertical edge 26e, and said vertical edge being interrupted by a rectangular notch 26f. As shown in Fig. 15, the flange 26b progressively widens at the top thus forming a laterally concave portion 26' of the driver blade 26. The rounded edge 26a with its flange 26b is so shaped as to interfit with the driver blade housing 23 to which it is rigidly attached, preferably by welding or other suitable means.

Figure 8:
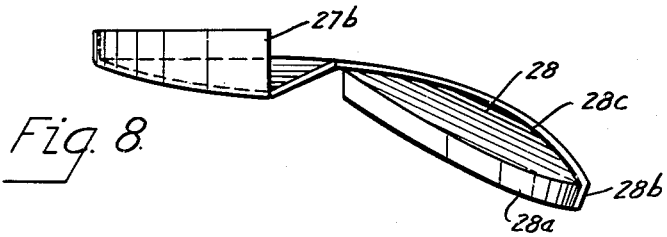
Fig. 8 is a top plan view of a fluid shifter blade of the impeller of my fluid coupling.
Figure 9:
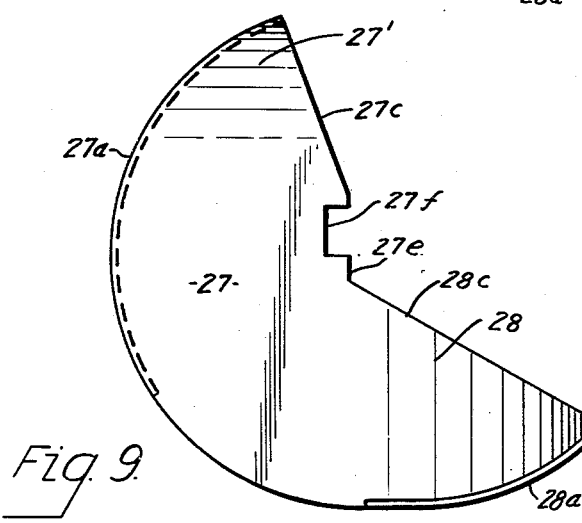
Fig. 9 is a side plan view of the fluid shifter blade of Fig. 8.
Figure 10:
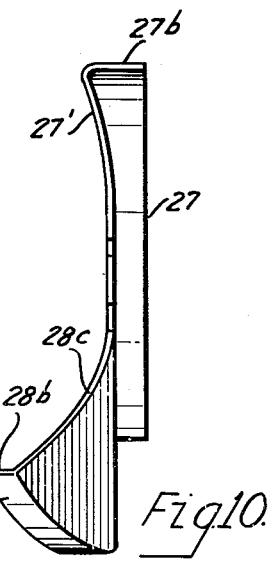
Fig. 10 is an end view of the fluid shifter blade of Figs. 8 and 9.

Referring now to Figs. 8, 9 and 10, in which are shown detailed views of a fluid shifter blade 27, it will be noted that the upper portion of said shifter blade is identical with a driver blade, having a concavely rounded edge 27a, a flange 27b, a straight edge 27c, a vertical edge 27e, said vertical edge being notched at 27f, and a laterally concave portion 27'.

The lower portion of the shifter blade 27 is provided with a shifter vane 28, said shifter vane projecting rearwardly into the turbine 40 (Fig. 1), the lower edge of said shifter vane conforming in contour with the concave surfaces of the driver blade housing 23 and the shifter vane housing 25. A straight edge portion 28c extends rearwardly and downwardly from the vertical edge 27e to the rearmost tip 28b of the shifter vane 28. A lateral flange 28a is provided on the lower edge of the shifter vane 28 which contacts the shifter vane housing 25, said flange being preferably welded or otherwise suitably attached to said shifter vane housing. The flange 28a projects laterally in the opposite direction from the flange 27b, and the shifter vane 28 is progressively laterally curved in the direction of the flange 28a from the body portion of said shifter vane for purposes later more fully described herein.

The driver blades 26 and the fluid shifter blades 27 are further strengthened, in the form illustrated in Fig. 1, by means of an impeller ring 29, said ring comprising arcuate sections 29a overlapping at the ends thereof to form a circumferentially continuous ring, said ring having notches 29b in the inner periphery thereof, said notches being so spaced and of such size as to interfit with the notches 26f and 27f in the driver blades 26 and the shifter blades 27 respectively. In the form shown, the ring 29 is rigidly attached to each of the driver blades 26 and the shifter blades 27 at the notches 26f and 27f of said blades, by means of welding.

The turbine 40 comprises a disc 41 having an outer circumferentially continuous, arcuately dished portion 42, said dished portion being forwardly concave. The arcuately dished portion 42 is provided, near the inner periphery thereof, with a radially outwardly directed step 43, said step providing clearance for the shifter vane housing 25 of the impeller 20, as is well shown in Fig. 1.

The turbine 40 is further provided with a plurality of radially outwardly disposed turbine blades 44, there being, in the form shown, preferably forty-two of said blades.

The turbine blades 44 are preferably circumferentially evenly spaced and so formed in contour as to interfit the forwardly concave surface of the dished portion 42, said blades having a rearward and upward generally arcuate edge 44a, and said edge being provided with a right angularly disposed flange 44b for welding or otherwise suitably attaching said turbine blade within said forwardly concave surface of said dished portion 42.

The turbine blades 44 are further provided with radially inwardly converging straight edge portions 44c complementarily angled to match the straight edge portions 26c and 27c of the driver blades 26 and the fluid shifter blades 27 respectively, while a straight edge portion 44d is so angled as to match the straight edge portion 28c of the shifter vane 28 as is best shown in Figs. 1, 9, 13 and 18. The straight edge portions 44c and 44d radially inwardly intersect a vertical edge portion 44e, said vertical edge portion being provided with a rectangular notch 44f.

Figure 11:
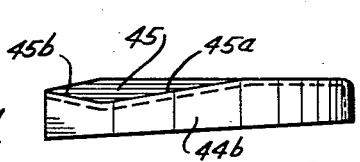
Fig. 11 is a top plan view of a turbine blade of my fluid coupling.
Figures 12, 13:
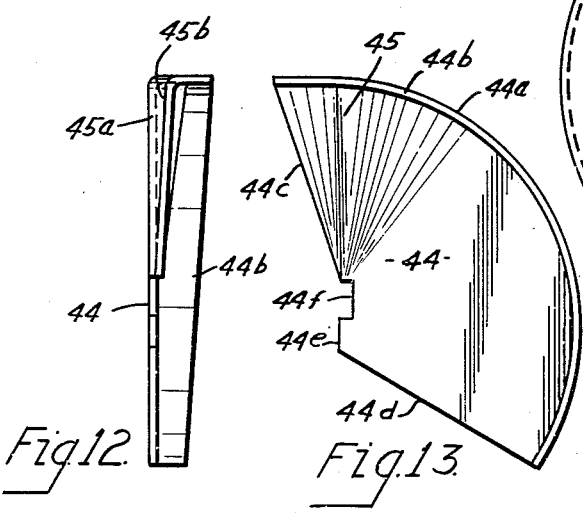
Fig. 12 is an end view of the turbine blade shown in Fig. 11.
Fig. 13 is a side plan view of the turbine blade as shown in Figs. 11 and 12.

The entrance portion of each of said turbine blades 44 is provided with a cup or depression portion substantially pyramidal in configuration as defined by a pair of triangular surfaces 45a and 45b (see Figures 11 and 12). These pyramidally aligned triangular surfaces have a common apex at substantially the center of the free edge of the turbine blade, and their alignment is such as to form the depression on the trailing side of the blade. It will be noted that surface 45b is forward, in a rotational direction, of the principal plane of the blade.

A turbine ring 49, corresponding in design and function to the impeller ring 29, is provided to circumferentially unite the turbine blades 44 at their notches 44f. The turbine ring 49 comprises circumferentially continuous, overlapping, preferably welded, arcuate sections 49a, said ring having notches 49b at the inner periphery thereof adapted to interfit with the notches 44f in the turbine blades 44 and to be welded or otherwise suitably attached thereto.

Referring now to Fig. 1, it will be understood that the impeller 20 and the turbine 40, when mounted upon a common axis, such as the crankshaft B and the main shaft 12, form a cross-sectionally slightly oblong torus section at the arcuately dished portions of said impeller and turbine, and that the complementarily contoured fluid shifter blades 27 and turbine blades 44 enclose an irregular, slightly interspaced separation S. It will also be understood that the shifter vanes 28 are contained by the fluid shifters 27 only, and that the interposed driver blades 26 do not project rearwardly into the turbine 40 at the bottom portions of said driver blades, as is best understood by referring to Figs. 6 and 7.

The axis for rotation of the fluid coupling of my invention is concentric with the axis of the crankshaft B, in the form shown. The crankshaft B, mounted for rotation in the rearmost wall of the engine block A, is provided with an externally splined extension 11, said extension projecting rearwardly from the engine block A into the fluid coupling housing C. A main shaft 12 is forwardly journalled at a circumferentially reduced portion 12' within the bearing 11' of the splined extension 11, said main shaft extending rearwardly into the transmission housing D and being journalled at 12a in the forward web D' of said transmission housing. The crankshaft B rotates freely relative to the main shaft 12, there being no direct mechanical connection between said crankshaft and said main shaft with respect to relative rotation.

The externally splined extension 11 of the crankshaft B is adapted to engage an internally splined hub 13 having a radially outwardly projecting, circumferentially continuous flange 14.

The main disc 21 of the impeller 20 is centrally apertured at 21' and adapted to be centered upon a rearwardly projecting portion of the bearing 11' provided in the splined extension 11. The disc 21 is securely fastened to the flange 14 of the hub 13 by a plurality of rivets 15. A flywheel 16 is preferably integrally united to the forwardly concave surface of the dished portion 22 of the main disc 21 by welding or other suitable means.

When the crankshaft B of the engine is rotating, the impeller 20 and the flywheel 16 are caused to rotate in the same direction by means of the referred to internally splined hub 13, said impeller being rigidly affixed to the flange 14 of said hub.

The turbine mounting assembly comprises a second hub 17 telescopably mounted upon the main shaft 12, a key 17' securing said hub portion against rotation relative to said main shaft. The hub 17 is provided, near the rearward end thereof, with a radially outwardly projecting, circumferentially continuous flange 18. The turbine disc 41 is centrally apertured at 41' and adapted to be telescopably mounted upon the rearmost portion of the said hub 17. The turbine disc 41 is secured to the hub 17, at the flange 18 thereof, by rivets 19 or other suitable means.

A thrust bearing 50 is concentrically mounted upon the main shaft 12 against the forwardly disposed surface of the web D' of the transmission D, and the turbine 40 is positioned against the forwardly disposed surface of said thrust bearing. Between the main disc 21 of the impeller 20 and the hub portion 17 there is preferably provided a spacer 30.

In view of the mounting arrangement of the impeller 20 and the turbine 40, it will be noted that said impeller is mounted to rotate directly under power from the crankshaft B, while said turbine is mounted to rotate upon the main shaft 12 by reaction to the rotation of said impeller. The reaction of the turbine 40 to the impeller 20 is transferred by means of a light oil with which the fluid coupling housing C is substantially filled. By referring to Figs. 6 and 7, it will be understood that the direction of rotation of the fluid coupling 10 is counterclockwise, as viewed from the rear looking forward, and clockwise, as seen from the front looking rearward. It will also be noted that the laterally concave portions 26' and 27' of the driver blades 26 and fluid shifter blades 27, the laterally curved shifter vanes 28 mounted upon the impeller and the cup portions 45 of the turbine blades 44, are all curved or cupped in the direction of rotation of the fluid coupling 10.

When the impeller 20 begins to rotate, the fluid within the fluid coupling housing C is forced by the impeller to flow in a rotational movement around the axis of the fluid coupling 10 by means of the driver blades 26 and the fluid shifter blades 27 carried thereby. As the impeller 20 gathers speed, the fluid within said impeller is subjected to considerable centrifugal force and flows radially outwardly in response thereto. The outwardly flowing fluid from the impeller 20 enters the turbine 40 near the outer circumference of said turbine and, guided by the concave surfaces of the torus ring, sets up a vortex flow within the torus. As long as the impeller 20 is rotating at a greater speed than the turbine 40, such vortex flow will continue. When referring to the flow of the fluid within the fluid coupling 10, "rotational flow" will herein refer to the movement of said fluid around the rotational axis of said fluid coupling, and "vortex flow" will refer to the movement of said fluid within the torus ring.

Figure 2:
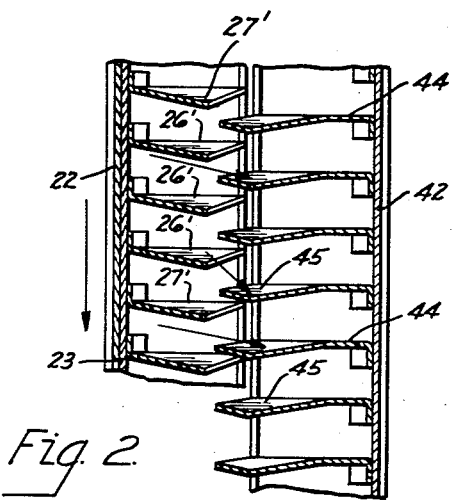
Fig. 2 is a fragmentary sectional view taken along the line 2—2 of Fig. 1.
Figure 3:
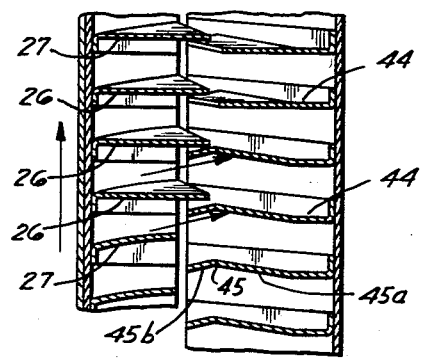
Fig. 3 is a fragmentary sectional view taken along the line 3—3 of Fig. 1.
Figure 4:
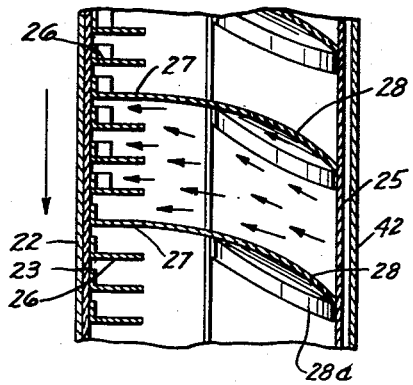
Fig. 4 is a fragmentary sectional view taken along the line 4—4 of Fig. 1.
Figure 5:
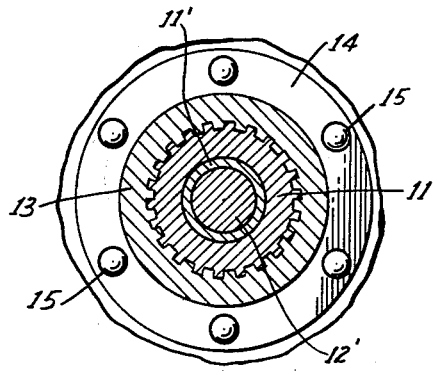
Fig. 5 is a fragmentary sectional view taken along the line 5—5 of Fig. 1.

The driver blades 26 of the impeller 20 thus produce a fluid pressure upon the turbine blades 44 driving the fluid into the cup portions 45 against the cup walls 45a, as is shown in Figs. 2 and 3. The cup portions 45 are deeper at the torus ring because the vortex flow is greatest at said torus ring. As seen in Fig. 1, the cup portions 45 of the turbine blades 44 are forwardly projected against or into the vortex flow. As shown in Fig. 3, the cup walls 45b of the cup portions 45 are angled against the direction of rotation of the fluid coupling 10, thus cutting the projected fluid and tending to prevent the rebound of fluid pressure.

Due to the radial disposition of the turbine blades 44, said blades are spaced relatively further apart near the outer circumference of the turbine 40 than radially inwardly therefrom. The fluid received near the outer circumference of the turbine 40 must, therefore, increase in velocity in its vortex flow, in order to pass through the progressively restricted channels between the radially inwardly converging turbine blades 44. This increased rate of flow causes the fluid to re-enter the impeller 20 near the inner circumference thereof, at a greater velocity than it left said impeller at the outer circumference thereof, resulting in an increased rate of rotation of said impeller.

The fluid re-entering the impeller 20, after leaving the turbine 40, is engaged and shifted in a positive manner from said turbine back to said impeller, by means of the shifter vanes 28. As shown in Figs. 6 and 10, the shifter vanes 28 and the laterally concave portion 27' of the fluid shifter blades 27 are curved in the direction of rotational flow. The shifter vanes 28 collect the fluid returning in the vortex flow from the turbine 40 and direct said fluid in a generally arcuate path from said shifter vane to the concave portion 27', thus rotationally thrusting said fluid into the turbine cup portions 45.

The improved flow characteristics of my fluid coupling, combining as they do the rotational flow, vortex flow and rotational thrust as herein described, result in a more positive linking of impeller to turbine in high speed operation and also result in an increase of torque during acceleration over prior art devices with which I am familiar.

If, when operating at high speeds, the driver of the automotive vehicle releases the accelerator, the turbine 40 is thereby caused to rotate faster than the impeller 20 and tends to reverse the vortex flow in the fluid coupling 10. Under these conditions the shifter vanes 28, projecting into the turbine 40 and being laterally curved, tend to oppose and baffle such reversal of vortex flow, creating a free-wheeling-like condition.

When the vehicle is not in motion and the engine is idling, the relatively wide spacing of the fluid shifter blades 27 tends to reduce drag or creep.

In Figs. 19, 20 and 21, I illustrate three forms of my invention in which I demonstrate structural means for mechanically connecting a plurality of the fluid couplings 10 (Figs. 1 to 18 inclusive) in series or parallel. It will be understood that these multiple coupling units are disposed between an engine block A and a transmission casing D, as in the first form of my invention; that said engine block is forwardly disposed and said transmission casing is rearwardly disposed; that said multiple coupling units are housed within a fluid containing, fluid coupling housing; and that each fluid coupling is substantially identical with my first form, or a reverse image thereof.

When referring to the fluid couplings of the multiple coupling units (Figs. 19, 20 and 21), fluid couplings, impellers and turbines will be designated by the numerals 10, 20, and 40 respectively, as in my first form, except for those parts which are reverse images of said fluid couplings, impellers and turbines, said reversed image parts being primed. In Figs. 20 and 21 it has been necessary to incorporate some modifications of the main discs of certain of the impellers, in which case said main discs have been given new reference numerals and have been fully described.

In Fig. 19, I show a second embodiment of my invention, said second embodiment being a multiple coupling unit comprising two fluid couplings 10 mechanically connected in series, wherein an externally splined extension 61 of the engine crankshaft B protrudes rearwardly from the engine block A, said splined extension being interfitted with an internally splined hub 63 having a radially outwardly extending, circumferentially continuous flange 64. A main shaft 62 is journaled within the splined extension 61 at a forwardly disposed, circumferentially reduced portion 62' of said main shaft, said splined extension being provided with an internal bearing 61' adapted to receive said reduced portion. The main shaft 62 extends rearwardly through the web D' of the transmission casing D and is journaled in said web at 62a, said main shaft being freely rotatable relative to the crankshaft B.

An intermediate sleeve shaft 65 is concentrically mounted for rotation around the main shaft 62, said intermediate sleeve shaft being disposed rearwardly of the hub 63. Behind the sleeve shaft 65 there is provided a thrust bearing 66, a second hub 67 and a second thrust bearing 69, said thrust bearing 69 being disposed against the forward surface of the web D' of the transmission casing D. The sleeve shaft 65 is provided with a circumferentially enlarged portion 65' and the hub 67 is provided with a radially outwardly projecting, circumferentially continuous flange 68. The hub 67 is keyed to the main shaft 62 with a key 67' and is adapted to rotate with said main shaft.

The impeller 20 of the forwardly disposed first fluid coupling 10 is concentrically mounted for rotation with the crankshaft B, said impeller being riveted or otherwise suitably attached to the flange 64 of the hub 63. The turbine 40 of the first fluid coupling 10 is concentrically mounted upon the enlarged portion 65' of the sleeve shaft 65. The impeller 20 of the rearwardly disposed second fluid coupling 10 is also mounted upon the intermediate sleeve shaft 65 at the enlarged portion 65' of said sleeve shaft. The turbine 40 of the second fluid coupling 10 is concentrically mounted for rotation with the main shaft 62 at the flange 68 of the hub 67, said turbine being riveted or otherwise suitably attached to said flange.

By referring to the impeller 20 of the first fluid coupling 10 as the first impeller and the turbine of said first fluid coupling as the first turbine; and by designating the impeller 20 of the second fluid coupling as the second impeller and the turbine of said second fluid coupling as the second turbine, the multiple coupling unit, as shown in Fig. 19, will be understood to operate in the following manner:

When the crankshaft B and the splined extension 61 are rotated by the engine, the first impeller rotates with it. The rotation of the first impeller causes the first turbine and the second impeller to rotate, said first turbine and second impeller being mounted for free rotation together upon the intermediate sleeve shaft 65. The second impeller rotates the second turbine which is mounted directly to the main shaft 62 through the keyed hub 63, thus rotating said main shaft. In this arrangement, the torque multiplication of the first fluid coupling is added, in series, to the torque multiplication of the second fluid coupling, thus providing a very smooth, powerful starting action.

In Fig. 20, I show a third embodiment of my invention comprising a multiple coupling unit preferably designed for heavy duty use, such as for trucks etc. having two fluid couplings 10' and 10 mechanically connected for operation in parallel. It will be noted that the relatively rearwardly disposed second fluid coupling 10 is substantially identical in arrangement with the fluid couplings of my first and second embodiments, whereas the relatively forwardly disposed first fluid coupling 10' is longitudinally reversed, the turbine 40' of said first fluid coupling being forwardly disposed relative to the impeller 20'. The fluid coupling 10' is, therefore, substantially a reverse image of the second fluid coupling 10 in all of its parts, and designed to rotate in the same direction.

The crankshaft B of Fig. 20 is provided with an externally splined extension 71 projecting rearwardly from the engine block A, said splined extension being adapted to be interfitted with an internally splined hub 73. The hub 73 is provided with a circumferentially continuous flange 74 to which is mounted, by riveting or other suitable means, a flywheel 75.

The impeller 20' of the fluid coupling 10' (Fig. 20) is provided with a modified main disc 80, said main disc having a circumferentially continuous, forwardly concave, arcuately dished portion 81 and a forwardly directed, circumferentially larger, cylindrical portion 82, said cylindrical portion being provided at its forward edge with a radially outwardly directed circumferentially continuous flange 83. The impeller 20' is secured to the flywheel 75 with bolts 85 or other suitable securing means at the flange 83 of the main disc 81. Spacer nuts 84 are disposed between the flange 83 and the flywheel 75 where said flange is attached to said flywheel, thus allowing fluid to enter the cavity formed by the dished portion 81 and the cylindrical portion 82 of said dished portion.

A main shaft 72 projects forwardly from the web D' of the transmission housing D, said main shaft being journaled at a forwardly disposed circumferentially reduced end portion 72' thereof within a bearing 71' of the splined extension 71 of the crankshaft B.

The main shaft 72 is journaled at 70' in the web D' at a circumferentially reduced portion 70 of said main shaft. The reduced portion 70 is of a longitudinal dimension corresponding to the longitudinal thickness of the web D', said main shaft being held against longitudinal axial movement by said web portion. The main shaft 72 is forwardly progressively circumferentially reduced from its largest dimension at 70d to a circumferentially reduced portion at 72c, a further reduced portion 72b, and a still further reduced portion 72a. When the hub 79, the intermediate sleeve shaft 78, and the hub 77 are assembled upon the main shaft 72 at the portions 72c, 72b and 72a respectively, the lock nut 76 maintains them in a longitudinally constant relationship. The sleeve shaft 78 cannot be longitudinally displaced due to said sleeve shaft abutting the foremost end surface of the relatively larger reduced portion 72c and the hub 79 in a rearward direction, said sleeve shaft abutting the hub 77 in a forward direction. The flywheel 75 is mechanically connected to the intermediate sleeve shaft 78 through the cylindrical portion 82 of the impeller 20', said flywheel being thereby maintained against longitudinal axial movement.

The turbine 40' of the fluid coupling 10' is concentrically mounted for rotation upon the hub 77, said turbine being riveted or otherwise suitably attached to a radially outwardly projecting, circumferentially continuous flange 77' of said hub. The hub 77 is keyed to the main shaft 72 by means of a key 77a and adapted to rotate with said main shaft.

The impellers 20' and 20 of the fluid couplings 10' and 10 are riveted or otherwise suitably attached to a circumferentially enlarged portion 78' of the intermediate sleeve shaft 78. The turbine 40 of the fluid coupling 10 is mounted for rotation with the main shaft 72 through a radially outwardly projecting, circumferentially continuous flange 79' of the hub 79, said hub being keyed to the main shaft 72 by means of a key 79a.

The operation of the multiple coupling of the third embodiment of my invention will be understood by following the mechanical linkage whereby the impellers 20' and 20 rotate as a unit upon the intermediate sleeve shaft 78 in response to rotation of the crankshaft B. The crankshaft B is mechanically lined for rotation with said impellers through the hub 73, the flywheel 75, and the cylindrical portion 82 of the main disc 80 of the impeller 20'. The turbines 40' and 40 rotate in response to the impellers 20' and 20 respectively, thus rotating the main shaft 72 through the hubs 77 and 79 respectively, said hubs being keyed to said main shaft.

In Fig. 21, I show a fourth embodiment of my invention particularly designed for extra heavy duty, as for example, diesel engines. This figure illustrates a method of preferably mounting three of the fluid couplings 10 of my invention in parallel relationship whereby three impellers are caused to rotate with the crankshaft B, said impellers rotating freely around the main shaft, and three turbines rotating said main shaft to which they are keyed, in response to said impellers.

The crankshaft B is provided with an externally splined extension 91, said splined extension projecting rearwardly from the engine block A into the fluid coupling housing C. A main shaft 92 is journaled within the splined extension 91 at the foremost end 92' thereof, and at 92a in the web D' of the transmission casing D. An internally splined hub 93 is adapted to be mounted upon the splined extension 91, said hub rotating with said splined extension of the crankshaft B.

The main shaft 92 has mounted upon it in telescopic relationship a keyed hub 94, an intermediate sleeve shaft 95, and a second keyed hub 96. The hubs 94 and 96 are thus adapted to rotate with said main shaft 92 and the intermediate sleeve shaft is adapted to rotate relative to said main shaft.

Three fluid couplings are mounted upon the splined extension 91 and the main shaft 92; a forwardly disposed first fluid coupling 10; a medially disposed, reverse image, second fluid coupling 10'; and a rearwardly disposed third fluid coupling 10.

The impeller of the first fluid coupling 10' is concentrically mounted upon the hub 93; the turbine of the first fluid coupling 10 and the turbine of the second fluid coupling 10' are mounted upon the hub 94; the impeller of the second fluid coupling 10' and the impeller of the third fluid coupling 10 are mounted upon the intermediate sleeve shaft 95; and the turbine of the third fluid coupling 10 is mounted to rotate with the hub 96. A plurality of circumferentially disposed connector links 100 mechanically connect the impeller of the first fluid coupling 10 with the impeller of the second fluid coupling 10'.

Thus, all impellers rotate together in response to the crankshaft B, said impellers freely rotating relative to the main shaft 92. All turbines rotate in response to the impellers, said turbines causing rotation in the main shaft 92 through keyed hubs 94 and 96.

It will be noted that in Figs. 1, 19 and 21 wherein the vortex flows of the fluid couplings are predominantly in a clockwise direction, thus exerting a longitudinal rearward thrust, I have provided thrust bearings to relieve the transmission of said thrust. In a balanced multiple coupling unit, such as I show in Fig. 20, thrust bearings are not required, as the vortex flows of the fluid couplings counter-balance each other.

In Figs. 22 to 26 inclusive, I show a fifth embodiment of my invention in which the fluid coupling unit 110 is contained within a fluid coupling housing C, said fluid coupling housing being mounted upon the rearmost surface of an engine block A, said fluid coupling housing being provided with a rearwardly extending transmission casing D and said fluid coupling having a prime mover in the form of a crankshaft B of an automotive engine.

The fluid coupling 110 comprises an impeller 120 and a turbine 140. The impeller 120 is concentrically mounted for rotation with an externally splined extension 111 of the crankshaft B and the turbine 140 is concentrically mounted for rotation upon a main shaft 112, said main shaft being coaxial with said splined extension.

The main shaft 112 is journaled at the most forwardly disposed circumferentially reduced, end portion 112' thereof, within a bearing 111' of the splined extension 111. The main shaft 112 is rearwardly journaled at 112b in the web D' from which it projects rearwardly into the transmission casing D.

Forwardly of the web D' the main shaft 112 has concentrically mounted upon it a thrust bearing 116. Immediately forward of the thrust bearing 116, the main shaft 112 is provided with circumferentially reduced portion 112a, said reduced portion being relatively larger than the end portion 112'. Upon the reduced portion 112a there is concentrically mounted a hub 115, and a thrust washer 114, said hub being keyed to the main shaft 112 for rotation therewith by a key 115'.

An internally splined hub 113 is adapted to be mounted upon the splined extension 111 and to rotate with said splined extension of the crankshaft B.

The impeller 120 in this form of my invention comprises a disc 121 having a circumferentially continuous, rearwardly concave, radially outwardly disposed dished portion 122, said disc being centrally apertured and adapted to be centered upon a rearwardly projecting portion of the bearing 111' in the splined extension 111. Within the concave dished portion 122, the impeller 120 is provided with radially outwardly disposed, circumferentially evenly spaced, rearwardly directed driver blades 117 of substantially similar contour to the driver blades 26 of Fig. 1. The driver blades 117 are attached to the dished portion 122 of the disc 121 by means of outwardly projecting ears or tabs 117' of said driver plates, said tabs projecting through slots 122' in the dished portion 122, said tabs being bent over.

The turbine 140 is substantially similar to the turbine 40 of Fig. 1, said turbine having a disc 141 with a forwardly concave, circumferentially continuous dished portion 142, said dished portion being radially outwardly stepped at 143, and being provided with circumferentially evenly spaced, forwardly directed turbine blades 144. The turbine blades 144 are attached to the dished portion 142 by means of tabs 144' projecting through slots 142' in said dished portion, said tabs being bent over.

The driver blades 117 of the impeller 120 and the turbine blades 144 of the turbine 140 are further reinforced by rings 129 and 149 respectively in a manner substantially similar to impeller ring 29 and turbine ring 49 of Fig. 1.

It will be noted that in this form of my invention (Fig. 22) the fluid shifter vanes are part of a separate fluid shifter 123 and are not directly attached to the impeller 120 as in the form of Figs. 1, 19, 20 and 21.

The fluid shifter 123 is preferably cast of light strong metal and comprises a shifter disc 124, an integrally formed, rearwardly and outwardly arcuately flared shifter body 125, and radially outwardly directed, circumferentially evenly spaced shifter vanes 126. As shown in Figs. 23, 24, 25 and 26, the shifter vanes 126 and the driver blades 117 are curved in the direction of rotation of the fluid coupling 110, said shifter vanes and driver blades thus directing the rotational flow, vortex flow, and rotationally forward thrust of the fluid in a manner substantially similar to that described in the disclosure of my first embodiment.

When assembled, the fluid shifter 123, the disc 121 of the impeller 120, and a flywheel 127 are mounted upon the internally splined hub 113, said parts thus being adapted to rotate with the crankshaft B. The disc 141 of the turbine 140 is riveted or otherwise suitably attached to the hub 115. When the crankshaft B is rotated, the flywheel 127, the impeller 120 and the fluid shifter 123 rotate with it as a unit. The turbine 140 rotates in response to the impeller 120 and the fluid shifter 123 as hereinbefore described.

It will be noted further that in this form of my invention, the shifter vanes 126 do not extend over as wide an arc of the torus as did the fluid shifters 28 of my first form, thus leaving a relatively large, circumferentially continuous fluid reservoir 130 between said shifter vanes and the driver blades 117. In operation the fluid returning from the turbine 140 to the impeller 120 enters the reservoir 130 and is distributed more evenly and smoothly therefrom to the driver blades 117.

It will be obvious that many departures from the details of my fluid coupling as herein disclosed are possible, such as in size and dimension, without, however, departing from the spirit of my invention or the scope of the appended claims.

What I claim is:

1. In a fluid coupling including a driving shaft, an impeller element concentrically mounted for rotation with said driving shaft, a driven shaft coaxial with said driving shaft, a turbine element concentrically mounted for rotation with said driven shaft, and said impeller and turbine elements providing complementary portions of a hollow torus section, the improvement comprising: extending the outer peripheral edge of said turbine element arcuately in the direction of said impeller element beyond a plane disposed medially through said torus section and perpendicular to the axis of said impeller element and turbine element, locating the outer peripheral edge of said impeller element so as to define a circle of registry with the outer peripheral edge of said turbine element, extending the inner peripheral edge of said impeller element arcuately in the direction of said turbine element beyond said medial plane, locating the inner peripheral edge of said turbine element so as to define a circle of registry with the inner peripheral edge of said impeller element, said turbine element having radially disposed blades extending from its outer to its inner peripheral edges, said impeller element having radially disposed blades, each blade extending from the impeller outer peripheral edge to a point horizontally opposite the inner peripheral edge of said turbine element, certain of said impeller blades having portions arcuately extending to the inner peripheral edge of said turbine element, said portions being complementarily shaped to and slightly spaced from said turbine blades, said turbine element being rotatable in the same angular direction as said impeller element, the entrance portion of each of said turbine blades having a depression which is substantially pyramidal in configuration as defined by a pair of adjacent triangular surfaces having their common apex at the center of the free edge of the blade, said depression being on the trailing side of the blade, the coupling operating in a fluid medium whereby the vortex flow of said fluid is directed by said impeller blades into the depressions of said turbine blades, and thereafter across the exit portions of said blades.

2. The fluid coupling set forth in claim 1, wherein the free edge of the triangular face adjacent the impeller element is forward, in a rotational direction, of the principal plane of the turbine blade.

3. In a fluid coupling including a driving shaft, an impeller element concentrically mounted for rotation with said driving shaft, a driven shaft coaxial with said driving shaft, a turbine element concentrically mounted for rotation with said driven shaft, and said impeller and turbine elements providing complementary portions of a hollow torus section, the improvement comprising: extending the outer peripheral edge of said turbine element arcuately in the direction of said impeller element beyond a plane disposed medially through said torus section and perpendicular to the axis of said impeller element and turbine element, locating the outer peripheral edge of said impeller element so as to define a circle of registry with the outer peripheral edge of said impeller element, extending the inner peripheral edge of said impeller element arcuately in the direction of said turbine element beyond said medial plane, locating the inner peripheral edge of said turbine element so as to define a circle of registry with the inner peripheral edge of said impeller element, said turbine element having radially disposed blades extending from its outer to its inner peripheral edges, said impeller element having radially disposed blades, each blade extending from the impeller outer peripheral edge to a point horizontally opposite the inner peripheral edge of said turbine element, certain of said impeller blades having portions arcuately extending beyond said medial plane to the inner peripheral edge of said turbine element, said portions being complementarily shaped to and slightly spaced from said turbine blades, the entrance portion of each of said turbine blades having a depression which is substantially pyramidal in configuration as defined by a pair of adjacent triangular surfaces having their common apex at the center of the free edge of the blade, said depression being on the trailing side of the blade, each of said impeller blades being concavely curved on its leading side adjacent the outer periphery of said impeller, the radius of curvature being about an axis parallel to the axis of rotation of said impeller, said certain of said impeller blades being concavely curved in the direction of rotation of said impeller about axes perpendicular to the axis of said impeller, and a fluid medium in which to operate said coupling, whereby a vortex flow of fluid is given a forward component of thrust by said first mentioned curved portions of said impeller blades to engage the outer of said triangular surfaces and impinge upon the inner of said triangular surfaces of said turbine blades, and whereby the portions of said impeller blades extending beyond said medial plane co-act with the portion of said impeller element extending beyond said medial plane to redirect said fluid back to said impeller blades.

References Cited in the file of this patent

UNITED STATES PATENTS

| | | |
|---|---|---|
| 1,703,407 | Shank | Feb. 26, 1929 |
| 1,937,364 | Sinclair | Nov. 28, 1933 |
| 2,151,075 | Berger | Mar. 21, 1939 |
| 2,255,515 | Popper | Sept. 9, 1941 |
| 2,393,859 | Jandasek | Jan. 29, 1946 |
| 2,488,478 | Roberts | Nov. 15, 1949 |
| 2,569,087 | Alexandrescu | Sept. 25, 1951 |
| 2,598,620 | Swift | May 27, 1952 |
| 2,720,952 | Alexandrescu | Oct. 18, 1955 |